United States Patent [19]
Flatland

[11] 3,767,055
[45] Oct. 23, 1973

[54] SKIMMER FOR A WATER BODY

[76] Inventor: Lloyd P. Flatland, P.O. Box 371, Corte Madera, Calif.

[22] Filed: Oct. 14, 1971

[21] Appl. No.: 189,271

[52] U.S. Cl. .............................. 210/242, 210/169
[51] Int. Cl. ........................................ E02b 15/04
[58] Field of Search............. 210/169, 242, DIG. 21; 15/1.7

[56] References Cited
UNITED STATES PATENTS

| | | | |
|---|---|---|---|
| 3,291,145 | 12/1966 | Arneson | 15/1.7 |
| 3,430,277 | 3/1969 | Ortega | 15/1.7 |
| 3,551,930 | 1/1971 | Myers | 15/1.7 |
| 3,268,081 | 8/1966 | Mentree et al. | 210/242 |

FOREIGN PATENTS OR APPLICATIONS

| 590,252 | 1/1960 | Canada | 210/169 |
|---|---|---|---|

Primary Examiner—Frank A. Spear, Jr.
Assistant Examiner—T. A. Granger
Attorney—Marcus Lothrop et al.

[57] ABSTRACT

A skimmer for a water body includes a float carrying a detachable trash receptacle having a forwardly directed opening. There is a propeller on the float offset from the float center for propelling the float and a settable rudder for guiding the float. A rotatable guard ring extends outwardly beyond the float to fend the float from obstacles and permit the float to turn away automatically. A decorative housing encloses much of the structure.

3 Claims, 4 Drawing Figures

PATENTED OCT 23 1973 3,767,055
SHEET 1 OF 2
FIG_1
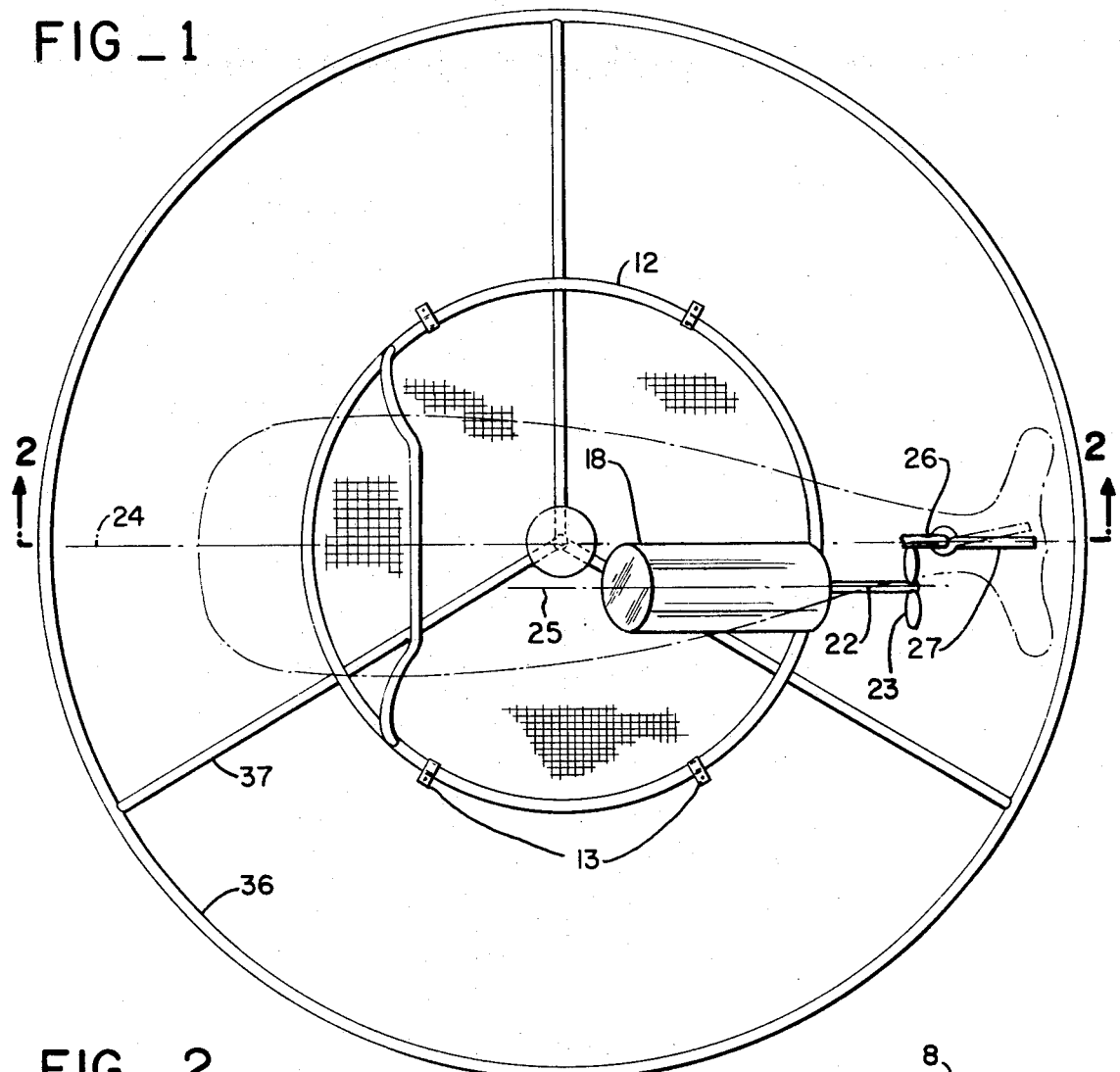
FIG_2
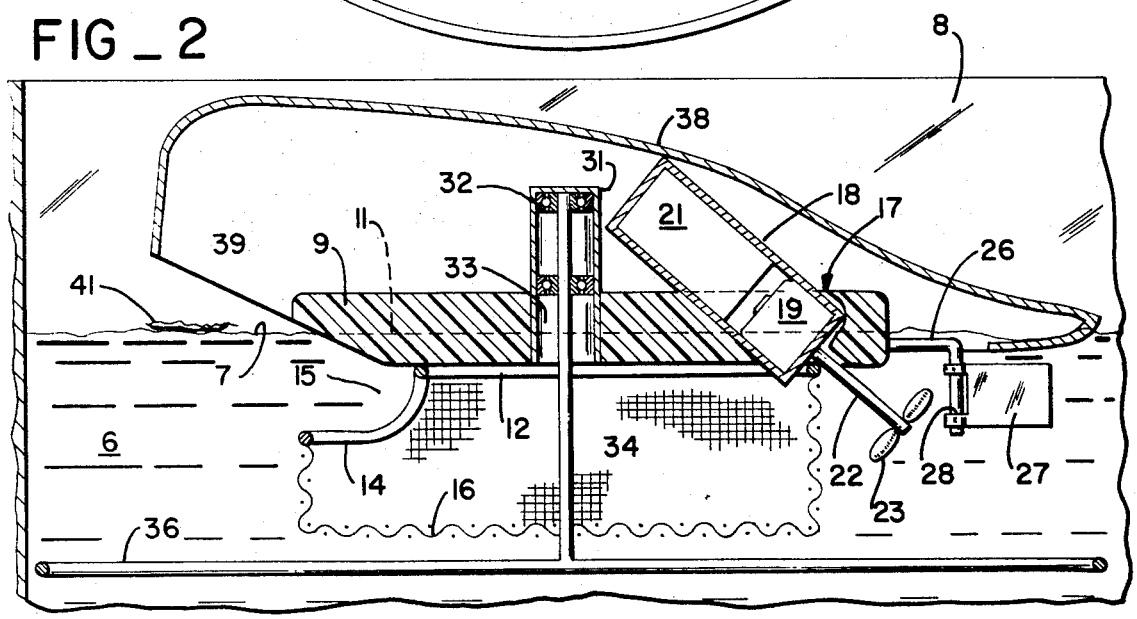

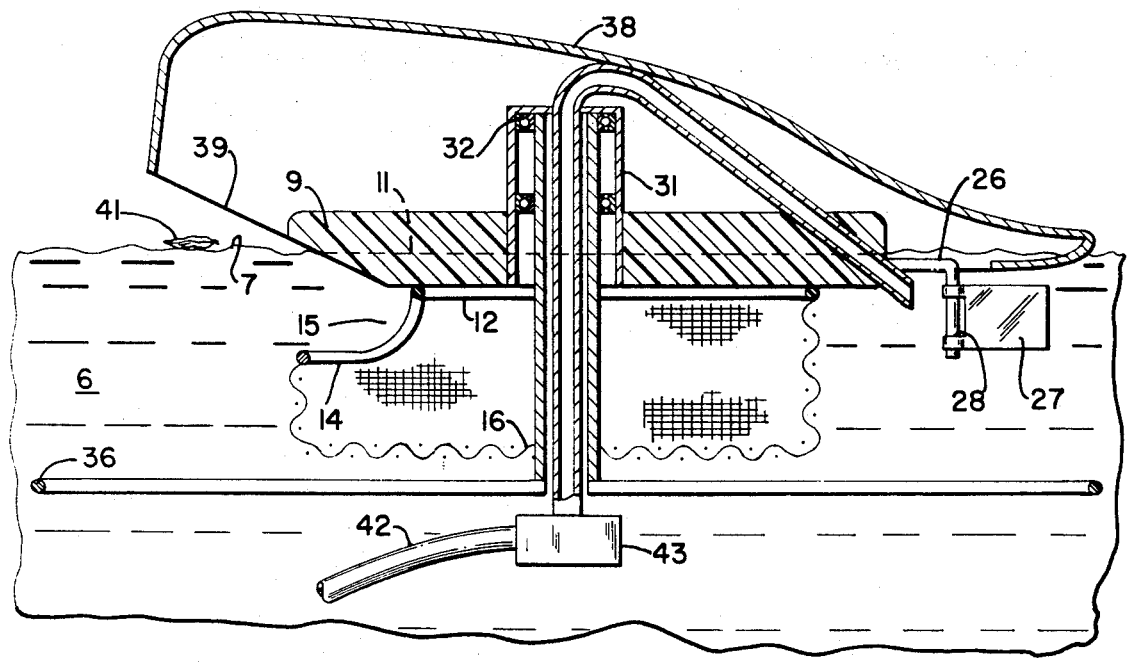
FIG_3
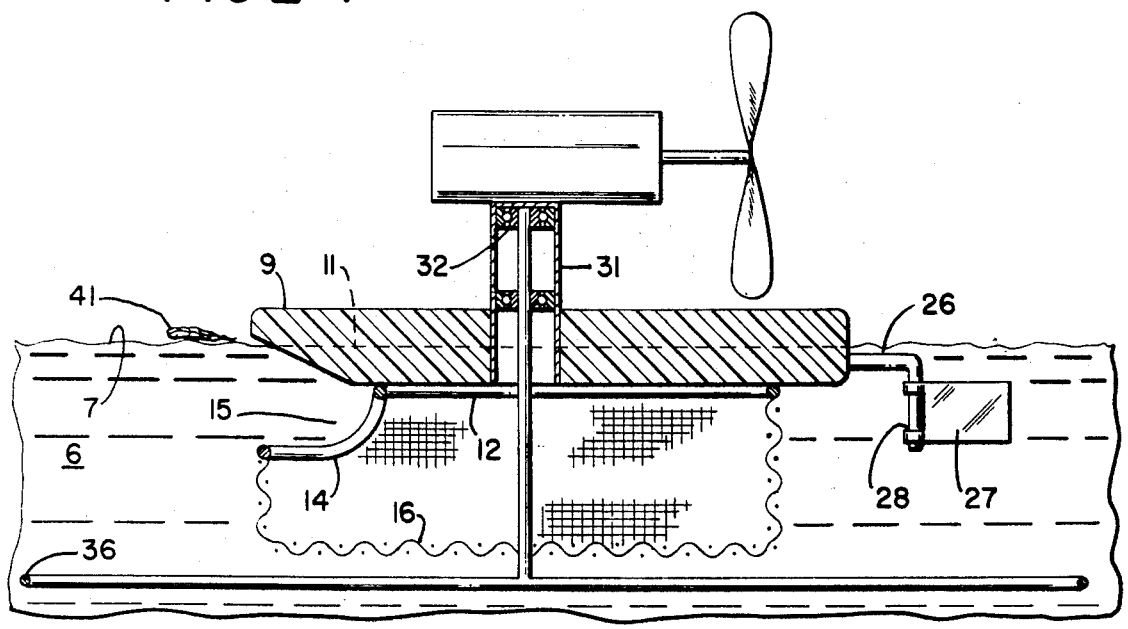
FIG_4

SKIMMER FOR A WATER BODY

There are many occasions on which it is desired to remove superficial debris from a water body. These occasions may extend all the way from an oil slick on an ocean or a bay to the leaves and other flotsam on the surface of a swimming pool. It is often desirable to remove material from the immediate surface of the water body. Debris or flotsam gathered can later be readily removed from the skimming device. The present invention is useful in skimming water bodies in general but is especially useful in skimming the surface of the water in swimming pools. The pool surface is usually surrounded by a wall or barrier of some sort, perhaps interrupted by an overflow trough, light well or the like and sometimes having projections such as steps, ladder stanchions and the like. Some existing swimming pool skimmers are particularly programmed to sweep in a regular and predetermined path in order that obstacles will be avoided and that most of the surface will be covered in a comprehensive fashion. Some skimmers require personal supervision and redirection if they become jammed in overflow troughs or between the ladder stanchions or step corners and the like. Many such devices utilize water under pressure as a propulsive force. This involves trailing a flexible water hose with the skimming device which itself can become caught.

It is therefore an object of my invention to provide a skimmer for a water body, particularly a swimming pool, in which the skimmer operates at random but eventually covers all of the pool surface.

Another object of the invention is to provide a skimmer which is protected from lodging in the ladder, steps, overflow or other boundary irregularities by a fending mechanism.

Another object of the invention is to provide a skimmer that remains in operation by automatically changing course upon encountering an obstacle.

A further object of the invention is to provide a skimmer for a water body which can operate for a protracted period on self-contained power.

Another object of the invention is to provide a water skimmer which may but does not necessarily have a trailing hose.

A further object of the invention is to provide a skimmer for a water body that cannot in any way injure swimmers in the water body.

Another object of the invention is to provide a skimmer which has an attractive and interesting appearance.

A further object of the invention is to provide a skimmer for a water body that is simple and direct in its construction and can be manufactured for a relatively small amount of money.

A still further object of the invention is in general to provide an improved skimmer for a water body.

Other objects together with the foregoing are attained in the embodiments of the invention described in the accompanying description and illustrated in the accompanying drawings, in which:

FIG. 1 is a plan of a skimmer constructed pursuant to the invention;

FIG. 2 is a cross section on a vertical plane indicated by the line 2—2 of FIG. 1;

FIG. 3 is a view like FIG. 2 but showing an alternate form of skimmer propulsion mechanism; and FIG. 4 is a side elevation of a portion of a modified form of skimmer propulsion mechanism.

In one form of the invention, as especially illustrated in FIGS. 1 and 2, the device is intended to operate in a body of water 6 having a surface 7 confined by a boundary wall 8. The water body can be of any shape desired and can even include the customary obstacles such as a ladder, overflow gutters, steps and the like.

The skimmer preferably includes a circular float 9 conveniently fabricated of any light material, such as a foamed plastic, and in a representative instance about a foot in diameter. The float is buoyant enough so that with appurtenant devices it rides in the water to a designed or predetermined depth and thus has a normal float line 11.

Situated on the float 9 is a frame 12, usually of light metal, adapted to be secured to the float by clips 13 so that the frame and the float can readily be separated. The frame in one portion is provided with a depressed yoke 14 defining an opening 15 or mouth between the frame 12 and the float 9. Suspended from the frame and the yoke is a porous net or similar screen basket 16 appropriately secured in place. The mesh size permits the basket readily to move through the water but is small enough to intercept debris such as leaves, twigs and the like.

Particularly pursuant to the invention, there is mounted on the float 9 a propulsion mechanism 17. This includes a support casing 18 in which a small electric motor 19 is situated. An adjacent battery 21 supplies electricity to the motor 19. The customary switching mechanism is afforded but is not shown. The motor 19 carries an elongated propeller shaft 22 at the end of which is mounted a multi-bladed propeller 23 disposed well below the water line 11 across the float from the opening 15. The housing 18 and the propeller shaft 22 are mounted somewhat off of the longitudinal center line 24 of the float. When seen in plan there is a substantial distance or moment arm between the center line or rotational axis 25 of the propeller shaft 22 and the center line 24 or center of mass of the float.

Connected to the float 9 by an extension 26 is a rudder 27 including a relatively flat plate having pivot rings 28 firmly engaging a vertical portion of the extension 26. The rudder 27 can be manually moved into and will then retain any desired angular position relative to its central position in line with the center line 24.

Disposed adjacent the center of the float 9 is a bearing housing 31 carrying anti-friction bearings 32 and 33 supporting a vertically extending shaft 34 supporting a circular guard ring 36. The shaft 34 and the ring are connected by radial spokes 37. The ring 36 has a diameter substantially greater than that of the float 9 and extends well beyond the periphery of the float in all directions. The ring 36 is located below the water line 11 but preferably is below the water line only a small amount so that the ring 36 travels higher than submerged steps or the like. Furthermore, the diameter of the ring may be made too large to lodge between the upright stanchions of a pool ladder or for the ring to become wedged in an overflow opening or the like. The ring 36, by reason of the anti-friction bearings 32 and 33, is mounted for very easy rotation with respect to the float 9, and so rolls along the pool walls and around any other similar obstructions without turning the float.

Means are provided for guiding leaves and flotsam into the opening 15 when the device is in operation. This means can be of an ornamental and attractive character. Removably mounted on the float 9 is a light casing 38 conveniently of plastic or the like which can be molded or formed in any one of a number of shapes. An appropriate one is that simulating the shape of a whale with an open mouth adjacent the opening 15. The casing can also be superficially decorated to carry out its representation. The casing 38 has an entrance portion 39 extending from some distance above the surface 7 to a point below the water line 11 at a gradual slope so that superficial debris such as a leaf 41 can be engaged and deflected and diverted toward the opening 15. Furthermore, the casing 38 can overlie and protect the extension 26 and the rudder 27.

In use, the assembled skimmer is floated on the surface 7 and sinks until the water line 11 and the surface 7 are substantially coincident. The rudder 27 is usually set substantially in a central position as illustrated. The battery 21 and motor 19 are connected so that the motor is energized and rotates the propeller 23. The initial propulsion of the float 9 is in a direction approximately that of the center line 24 so that the opening 15 is moved toward superficial debris. The guiding effect of the opening 39 assists in driving the debris in through the opening 15 and into the net or basket 16 wherein the debris lodges and is captured. Since the propeller 23 and its rotational axis 25 are slightly offset from the center line, its effect is to direct the float 9 in a particular circular or curved direction, although this is generally modified or entirely canceled by the effect of the slightly turned rudder 27. But the rudder is not particularly effective at slow speed, so the float 9 starts out in a curved path resulting from the propeller offset. As the float gathers speed the rudder becomes more effective and the float tends to move more nearly in a generally straight line. The motion of the float in the pool, for example, is also a partly random one since the casing 38 is susceptible to superficial winds and wave formations. Insofar as the device moves in a particular path, it continues until the guard ring 36 encounters an obstacle such as the wall 8. The guard ring rotates very freely because of the anti-friction bearings so that the float may tend to glance off of or move along the wall until it comes, say, to a corner. If the corner stops the ring, the rudder becomes virtually ineffective but the spinning propeller, being offset, tends to rotate the float within the ring until the propeller is disposed in a direction effective to advance the skimmer into open water or around the obstruction.

The random motion of the device in the water means that every portion of the pool surface will at some time or another be covered and the automatic course changing feature precludes stalling or arrest of the skimmer in one location. The motor 19 is extremely small but the present available flashlight or electric cell 21 contains enough energy to operate the motor 19 under normal conditions for several hours, a present average being up to about fifty hours. This period of service is usually more than adequate to accomplish all the necessary surface skimming in a domestic swimming pool, for example. At the conclusion of the sweeping operation the operator may remove the device from the pool, since it is relatively light, and can detach and empty the basket 16 and restore it for further service. At the same time, if necessary, he can replace the battery 21. Likewise he can reset the rudder 27 to a different angle if he cares to alter the maneuvering of the random motion of the float.

In the modification shown in FIG. 3 the battery and propeller unit is not utilized but instead a very light flexible hose 42 from the customarily provided pool filter return (not shown) is connected to the float 9 through a swivel connection 43. An outlet pipe 44 affords a reaction jet to propel the unit. In this instance the jet is slightly offset just as is the propeller shaft 22 and the same type of propulsion, random motion and automatic course changing occur.

As a further alternative, the arrangement of FIG. 4 is sometimes used. In this instance the propeller shaft 46 and the propeller 47 are both disposed above the float 9 and out of the water, although the offset of the propeller rotational axis from the center line or center of mass of the float is still observed. An advantage of the air propeller is that none of the propulsion machinery must be specially designed to operate under water. The operating characteristics and operating time per battery are about the same as with the underwater propeller.

What is claimed is:

1. A skimmer for a water body having an open surface comprising a float, a screen-like basket, means for suspending said basket immediately below said float, means on said float and said basket defining a mouth opening in one direction into said basket and extending both above and below said surface, a shaft, means for mounting said shaft centrally on said float to extend along a vertical axis, a ring in plan encompassing said float and said basket, means for connecting said ring coaxially with said shaft, means for propelling said float and basket including a propeller adapted to exert propulsive force along a line, and means for mounting said propelling means upon said float with said line extending in said direction and to one side of said vertical axis whereby said propeller exerts a torque upon said float about said vertical axis has been added.

2. A skimmer as in claim 1 including means for supporting said shaft and said guard ring for free rotation about said axis.

3. A skimmer as in claim 2 in which said supporting means includes a bearing disposed on said supporting means and is entirely above said water.

* * * * *